United States Patent
Ludwig (12) 
(10) Patent No.: US 6,256,498 B1
(45) Date of Patent: Jul. 3, 2001

(54) LOCATION DEPENDENT WWW SERVICE IN DIGITAL CELLULAR COMMUNICATION NETWORKS

(75) Inventor: Reiner Ludwig, Hürtgenwald (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/114,905

(22) Filed: Jul. 14, 1998

(30) Foreign Application Priority Data

Jul. 15, 1997 (DE) .............................................. 197 30 363

(51) Int. Cl.[7] ....................................................... H04Q 7/20
(52) U.S. Cl. ............................ 455/433; 455/557; 455/575
(58) Field of Search .................................... 455/433, 557, 455/575, 456, 556, 517, 524, 525

(56) References Cited

U.S. PATENT DOCUMENTS

| | | | |
|---|---|---|---|
| 4,667,202 | 5/1987 | Kammerlander et al. | 342/457 |
| 5,208,756 | 5/1993 | Song | 364/449 |
| 5,212,822 * | 5/1993 | Fukumine et al. | 455/33.1 |
| 5,289,527 * | 2/1994 | Tiedemann, Jr. | 379/59 |
| 5,293,645 | 3/1994 | Sood | 455/54.1 |
| 5,515,419 | 5/1996 | Sheffer | 379/58 |
| 5,724,660 * | 3/1998 | Kauser et al. | 455/456 |
| 5,822,539 * | 10/1998 | Van Hoff | 395/200.66 |
| 5,832,381 * | 11/1998 | Kauppi | 455/432 |
| 5,930,699 * | 7/1999 | Bhatia | 455/414 |
| 5,931,917 * | 8/1999 | Nguyen et al. | 709/250 |
| 5,938,721 * | 8/1999 | Dussell et al. | 701/211 |
| 5,966,378 * | 10/1999 | Hamalainen | 370/348 |
| 5,970,059 * | 10/1999 | Ahopelto et al. | 370/338 |
| 5,983,090 * | 11/1999 | Aoki | 455/403 |
| 6,047,327 * | 4/2000 | Tso et al. | 709/232 |
| 6,115,754 * | 9/2000 | Landgren | 709/249 |

FOREIGN PATENT DOCUMENTS

| | | | |
|---|---|---|---|
| 44 09 178 | 9/1995 | (DE) . | |
| 19730363A1 * | 1/1999 | (DE) | H04Q/7/20 |
| 0 141 994 | 5/1985 | (EP) . | |
| 0 320 913 | 6/1989 | (EP) | G01S/5/14 |
| 0 647 076 | 4/1995 | (EP) | H04Q/7/22 |
| 0 690 639 | 1/1996 | (EP) . | |
| 93/19538 | 9/1993 | (WO) . | |
| 97/07467 | 2/1997 | (WO) | G06F/17/30 |
| WO 98/59506 * | 12/1998 | (WO) | H04Q/7/22 |

OTHER PUBLICATIONS

IEEE–IEE Vehicle Navigation & Information Systems Conference, Ottawa—VNIS, Dec. 10, 1993, J. Hellaker, et al., "Real–time Traveller Information . . . GSM terminals", pp. 49–52.

* cited by examiner

Primary Examiner—Daniel Hunter
Assistant Examiner—C. Chow
(74) Attorney, Agent, or Firm—Burns, Doane, Swecker & Mathis, L.L.P.

(57) ABSTRACT

A mobile station (MS) for a digital cellular communication network (GSM) supporting WWW services comprises a receiver (4) for broadcast information transmitted from at least one base station sub-system (BSS 1; . . . ; BSS 5), a location data filter (6) adapted to select location specific data from the received broadcast information, and a mobile device interface (8) adapted to establish a connection to a mobile device (MD) being connected to the mobile station (MS), to receive a request for the location specific data from the mobile device (MD) and to transfer the location specific data to the mobile device (MD). The transfer of location specific data to a server being linked to the mobile device via a global data bearer services network allows for the provision of location dependent WWW services at the mobile device (MD).

42 Claims, 9 Drawing Sheets

LOCATION DEPENDENT WWW SERVICE IN DIGITAL CELLULAR COMMUNICATION NETWORKS

FIELD OF THE INVENTION

The present invention relates to location dependent World Wide Web services that may be provided via a digital cellular communication network.

BACKGROUND OF THE INVENTION

Digital cellular communication networks, e.g. the pan-European mobile communication network GSM for which technical specifications have been elaborated by the European Telecommunication Standards Institute ETSI, allow its users to initiate and receive calls at any geographical area within the radio coverage of the home public land mobile network HPLMN operated by the network operator selected by the subscriber and also within the radio coverage of partners of the network operator providing services within the home public land mobile network HPLMN, i.e. network operators having a roaming agreement with the HPLMN-network operator.

Basic sub-systems in the architecture of such a digital cellular communication network are a base station sub-system BSS, a network and switching sub-system NSS and an operational sub-system OSS. The base station sub-system BSS provides and manages transmission paths between mobile stations MS and the network and switching sub-system NSS. The network and switching sub-system NSS manages communications and connections to mobile stations MS.

Figure 8:
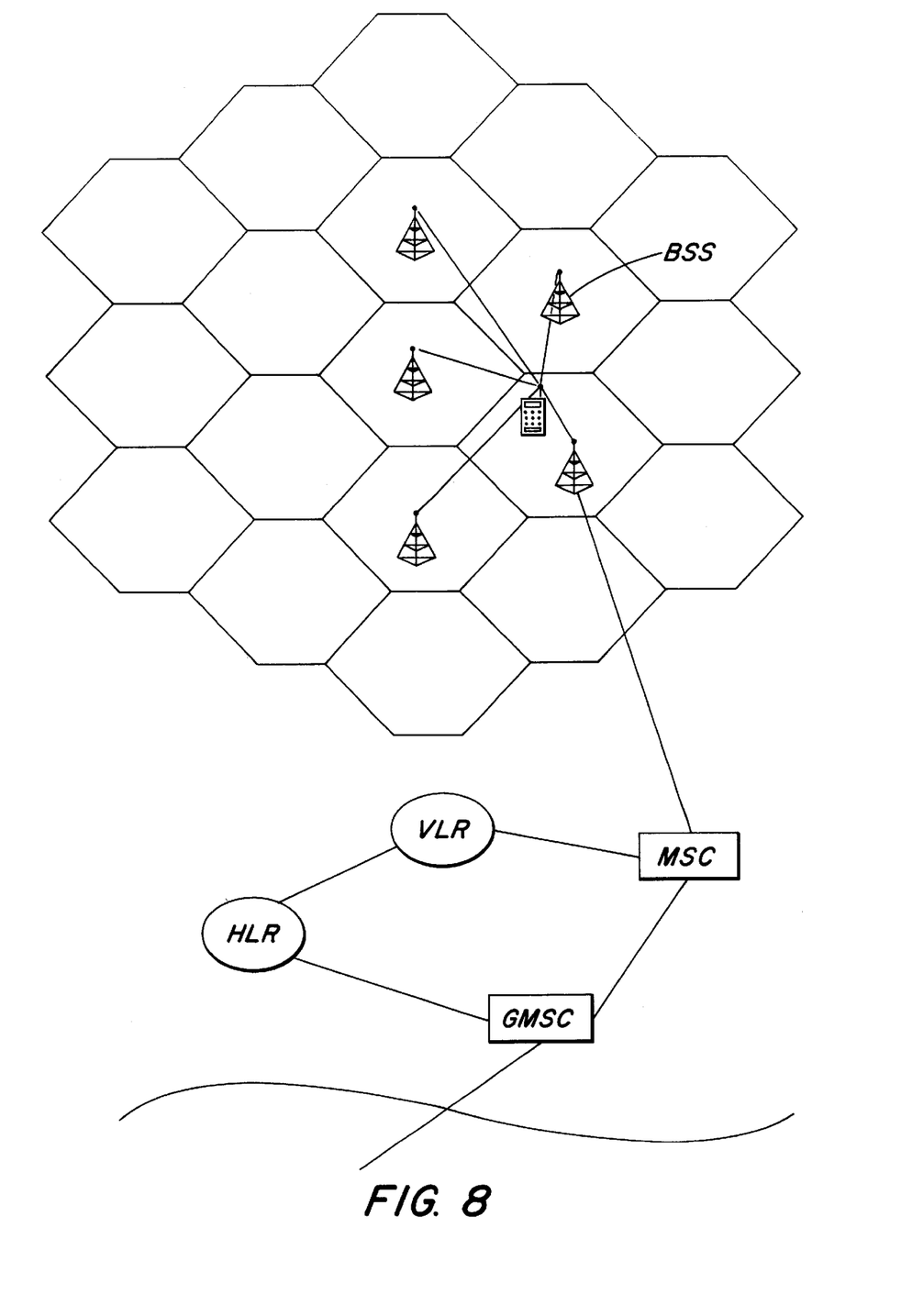
FIG. 8 shows a basic structure underlying a digital cellular communication network according to the GSM standard.

FIG. 8 shows components of the digital cellular communication network being related Lo the network and switching sub-system NSS, the base station sub-system BSS and the mobile station MS, respectively.

To achieve a link between different service areas there is provided a gateway mobile service switching centre GMSC that serves to determine specific locations of a mobile station MS, to route calls towards a mobile station MS and to connect to other networks. The gateway mobile service switching centre GMSC is connected to a functional unit called home location register HLR wherein subscriber information and mobile information is stored to allow incoming calls to be routed to the mobile station MS.

To route a call to a mobile station MS the gateway mobile service switching centre GMSC is also connected to a mobile service switching centre MSC through which the mobile station MS can obtain a service. The mobile service switching centre MSC performs the necessary switching functions required for mobile stations MS covered by this mobile service switching centre MSC. Also, the mobile service switching centre MSC monitors the mobility of its mobile stations MS and manages necessary resources required to handle and update the location registration resources.

As shown in FIG. 8 the public land mobile network PLMN comprises a plurality of mobile service switching centres MSC and respective service areas each covering a predetermined number of basic cells wherein a mobile station MS can move. To this end, each mobile service switching centre MSC is connected to a visitor location register VLR. The visitor location register VLR is a functional unit that dynamically stores mobile station information, such as the location area in case the mobile station is located in the service area covered bay the visitor location register VLR. When a roaming mobile station MS enters a service area assigned to a specific mobile service switching centre MSC the mobile service switching centre MSC informs the associated visitor location register VLR.

Further, the base station sub-system BSS corresponds to physical equipment providing radio coverage to the above-mentioned cells which are approximately hexagonal geographical regions. Each base station sub-system BSS contains equipment required to communicate with the mobile station MS.

Figure 9:
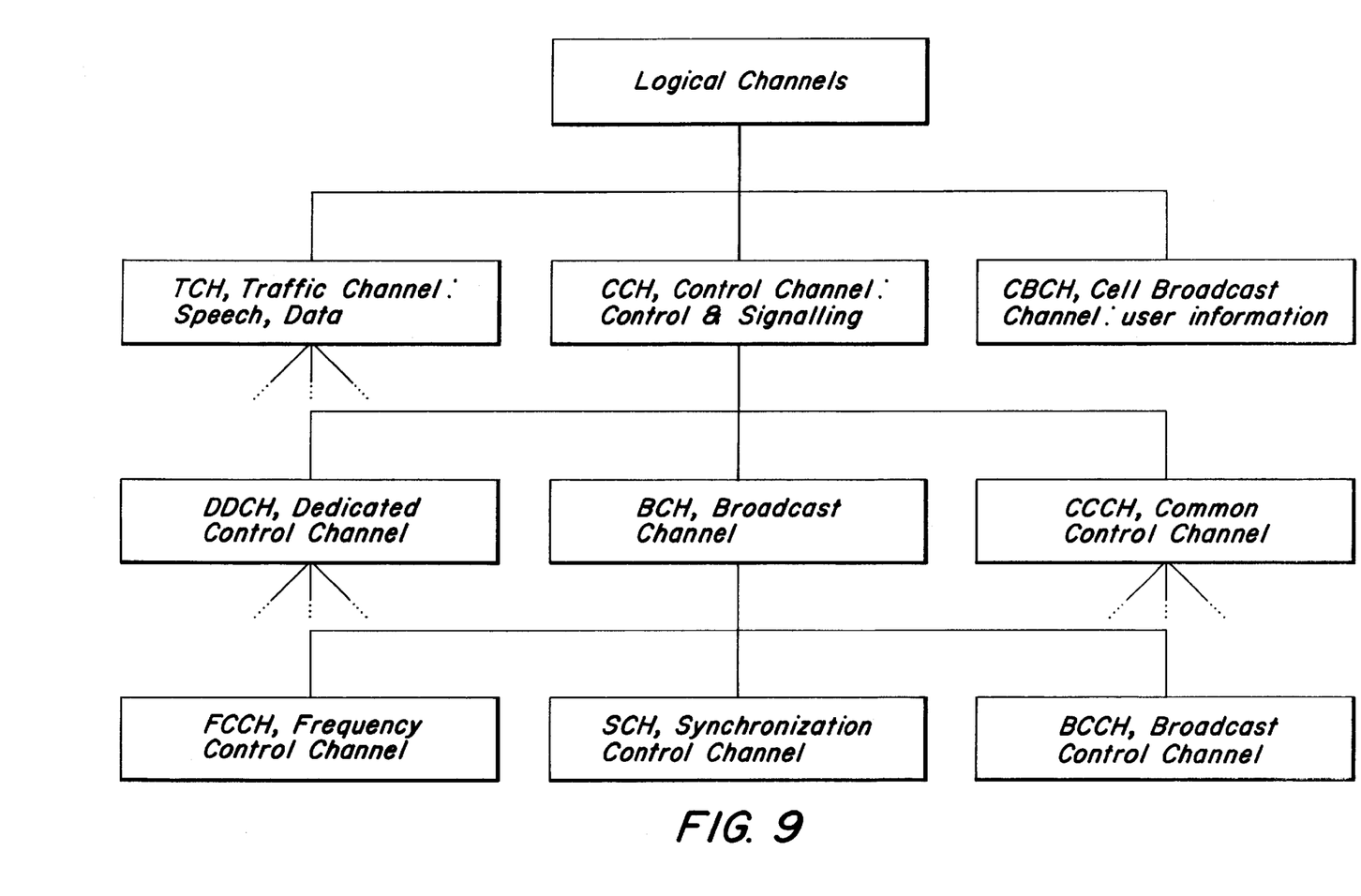
FIG. 9 shows the transaction channel hierarchy for a digital cellular communication network according to the GSM standard.

As shown in FIG. 9, there are three types of logical channels in the digital cellular communication network: traffic channel TCH, control channel CCH, and cell broadcast channel CBCH. The traffic channel TCH is used to transmit user information like speech or data. The control channel CCH is used to transmit control and signalling information. Finally, the cell broadcast channel CBCH is used to broadcast user information from a Mobile Services Switching Centre MSC to the Mobile Station MS listening in a given basic cell/basic service area.

In particular, each control channel CCH consists of a dedicated control channel DCCH used, e.g., for service request or subscriber authentication, a common control channel CCCH used for paging and access as well as a broadcast channel BCH. The broadcast channel BCH sub-divides into a frequency control channel FCCH used to transmit frequency correction data, a synchronization control channel SCH including the TDMA frame number and the base station identity code BSIC required when measuring signal strength and finally a broadcast control channel ECCH.

Using this architecture for a digital cellular communication network, there may be provided different communication capabilities to subscribers. The basic communication services provided in the GSM digital cellular communication network are divided into three main groups: bearer services, teleservices, and supplementary services.

Contrary to digital cellular communication networks designed for mobile communication the World Wide Web, WWW, was initially designed as mechanism for document distribution, and now is rapidly becoming the standard infrastructure for diverse interactive applications. The ubiquity of the hypertext metaphor and browser technology make WWW applications attractive for a variety of business uses.

The WWW is based on a hypertext model where documents called Web sites or, equivalently, Web pages contain a plurality of different information, e.g. graphics, animation or music. The protocol underlying the WWW is the hypertext transmission protocol. This protocol is designed to support interactive WWW applications where, e.g., a WWW server responds to a request sent across a network by a WWW application or WWW client.

Within location dependent WWW services the geographical location of a user running a WWW application is conveyed from a mobile device, e.g., a laptop, to the relevant WWW server before requested location dependent information can be delivered by the WWW server.

In many instances the user must manually provide the geographical location, e.g., by connecting the mobile computing device to an ISDN socket. Of course this is very unwieldy, in particular when the user forgets to update the location or does not know how to specify the location.

Therefore, to make geographical location information available for applications running on a mobile device, satellite-based GPS systems have been proposed. Here links to mobile devices are established via so-called PCMCIA interfaces (Personal Computer Memory Card International Association) working with a hardware/software interface definition for portable computers. However, this approach requires additional GPS receivers to overcome the problem that most networks do not provide location specific information which is not very cost effective.

Another method for the exact geometrical positioning of mobile stations is proposed in EP-A-0 320 913. The mobile station receives signals from at least three fixed stations of known location and the location of the mobile station is then calculated on the basis of these signals. It is essential that all base station sub-systems are in precisely the same clock time. The mobile station information must be compiled to indicate propagation delay in receipt of timing reference signals from the base station sub-systems and then be transmitted thereto. Overall the method is complex and requires additional hardware and communication overhead.

Thus, currently the determination of the geographical position of a mobile station in a digital cellular communication network with low overhead and being simple to implement is not possible.

Also, services in a digital cellular communication network offering location dependent information, e.g. weather forecast or route traffic information etc., do not exist.

SUMMARY OF THE INVENTION

In view of the above, one object of the invention is to provide location dependent services in digital cellular communication networks with low overhead in equipment and communication.

Another object of the invention is to enable location dependent services through effective integration of internet access in digital cellular communication systems.

According to one aspect of the invention, a mobile station comprises a receiver for broadcast information transmitted from, e.g., a plurality of base station sub-systems lying adjacent to the mobile station. A location data filter selects location specific data from the received broadcast information that is received via the plurality of base station sub-systems. In addition, the mobile station establishes a connection to a mobile device roaming together with the mobile station to receive a request for the location specific data from the mobile device and to transfer the location specific data to the mobile device.

One advantage of the inventive mobile station is that cell identities are made available to an attached mobile device so that within the digital cellular communication network the current location of the mobile station within the area of a few base station sub-systems may easily be provided to the relevant application software running on the mobile device.

It is important to note that according to the invention the geographical location of a mobile station is not necessarily determined exactly, but within a precision of a few cells, e.g., at worst +/−30 km. This allows for a significant reduction of the overhead, since no extra communication is initiated to determine a mobile station's geographical location. Also, the smaller the cell sizes in a specific area the better the precision.

The slightly reduced precision achievable with the inventive approach is sufficient enough for practical location dependent WWW services, e.g., weather forecast or route traffic information or information on the nearest taxi company, and therefore allows to avoid over engineering of resources beyond realistic requirements.

Another aspect of the invention relates to the integration of internet access into digital cellular communication networks for the implementation of packet-switched or circuit-switched data bearer service system that comprises as first component a digital cellular communication network with at least one network and switching sub-system adapted to transfer broadcast information to at least one base station sub-system therein. A mobile station roams in the digital cellular communication network and receives broadcast information from the at least one base station subsystem. Further, a mobile device is connected to the mobile station via a mobile device interface. The second component corresponds to a packet data network, e.g. internet or X.25, connecting a WWW server to the digital cellular communication network.

As with the previous aspect of the invention the mobile station comprises a location data filter adapted to transfer location specific data extracted from the broadcast information to the mobile device on request of the mobile device. The mobile device is adapted to request a location dependent WWW service from the WWW server on the basis of location specific data. In addition, the WWW server comprises a Web site generator to generate a location dependent WWW site according to the request received which is then retransmitted to the mobile device.

Combining the WWW service with digital cellular communication network where information about the geographical location of the mobile station is available offers new service possibilities, e.g., location specific web sites may offer weather forecast or route traffic information depending on the geographic location of the mobile station.

Further, the location dependent services may also be combined with known methods for determining the exact geographical position of a mobile station in case an increased precision is required for specific applications while a approximation of the geographical location for others.

Still further, the location dependent WWW services are only one possible application of the invention. Other applications aside the internet and/or WWW are easy to imagine on the basis of the invention, e.g., monitoring, modification, and other operational management, administrations and maintenance features such as logging, performance data collection, error reporting, on-line administration, data update and software upgrades of services running on mobile devices.

Further, according to the invention the mobile station provides the information for determining its geographical location also in idle mode. Opposed to existing solutions, according to the invention mobile station location information is not provided to the digital cellular communication network. This is important for privacy reasons.

Finally, the invention does not require hardware changes. According to the first aspect, no new communication is introduced. In addition, according to the second aspect being related to the data bearer services network, only a single new signalling message is added to the cell broadcast channel CBCH thus requiring only minimal communication overhead.

Overall, the invention makes the use of GPS obsolete and enables digital cellular communication network operators to exploit, e.g., GSM features that PSDN or ISDN operators cannot offer. Therefore, it is advantageous for a digital cellular communication network operator to offer new location dependent internet services to subscribers by combining the digital cellular environment with the internet.

BRIEF DESCRIPTION OF FIGURES

Exemplifying embodiments of the invention will now be described in more detail with reference to the accompanying drawings, in which.

DESCRIPTION OF PREFERRED EMBODIMENTS

Figure 1:
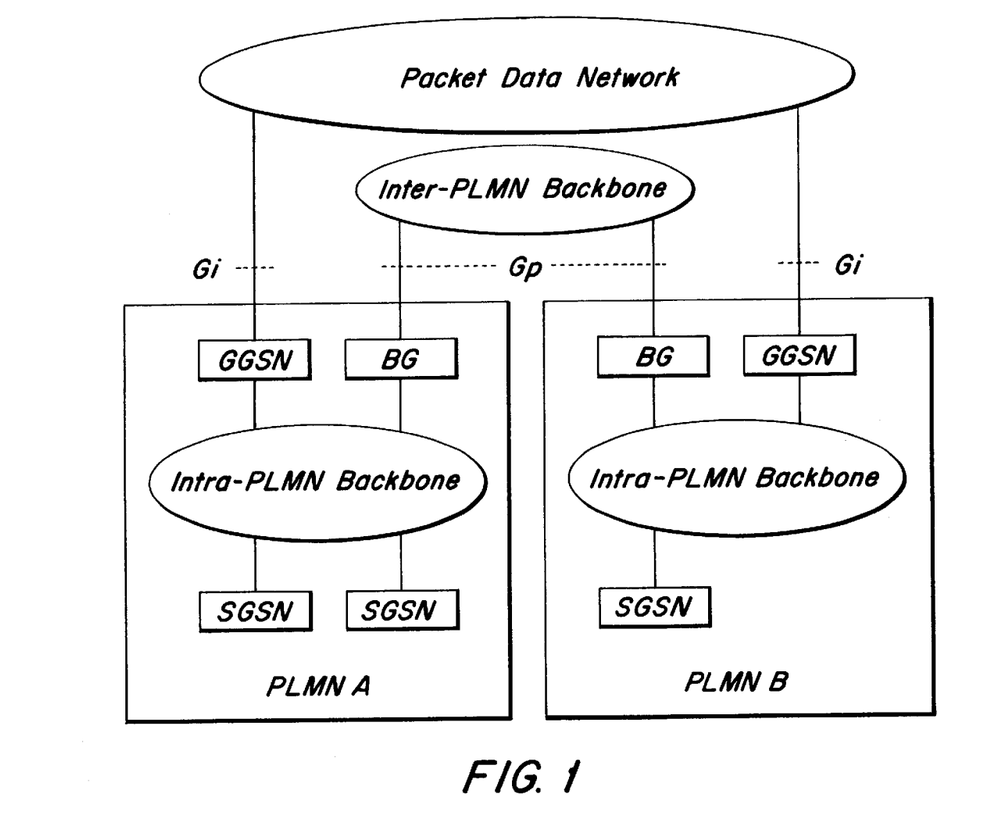
FIG. 1 shows intra- and inter-PLMN backbone networks as basis for the integration of WWW services into a digital cellular communication network.

FIG. 1 gives an overview on the logical architecture of the general packet radio service GPRS as specified in the ETSI GSM 03.60 specification. Here, for the implementation of the general packet radio service GPRS there are provided two kinds of GPRS backbone networks. The first is an intra-PLMN backbone network and the second is an inter-PLMN backbone network. Further, a GPRS support node GSN contains functionality required to support GPRS.

In one PLMN there may be more than one GSN node. The GPRS gateway support node GGSN is the node which is accessed by the packet data network due to evaluation of a packet data protocol address PDP that contains routing information for attached GPRS users, e.g. in internet protocol IP or X.25. This routing information is used to tunnel packet data units PDUs to mobile stations current point of attachment, i.e. the serving GPRS supporting node.

Figure 2:
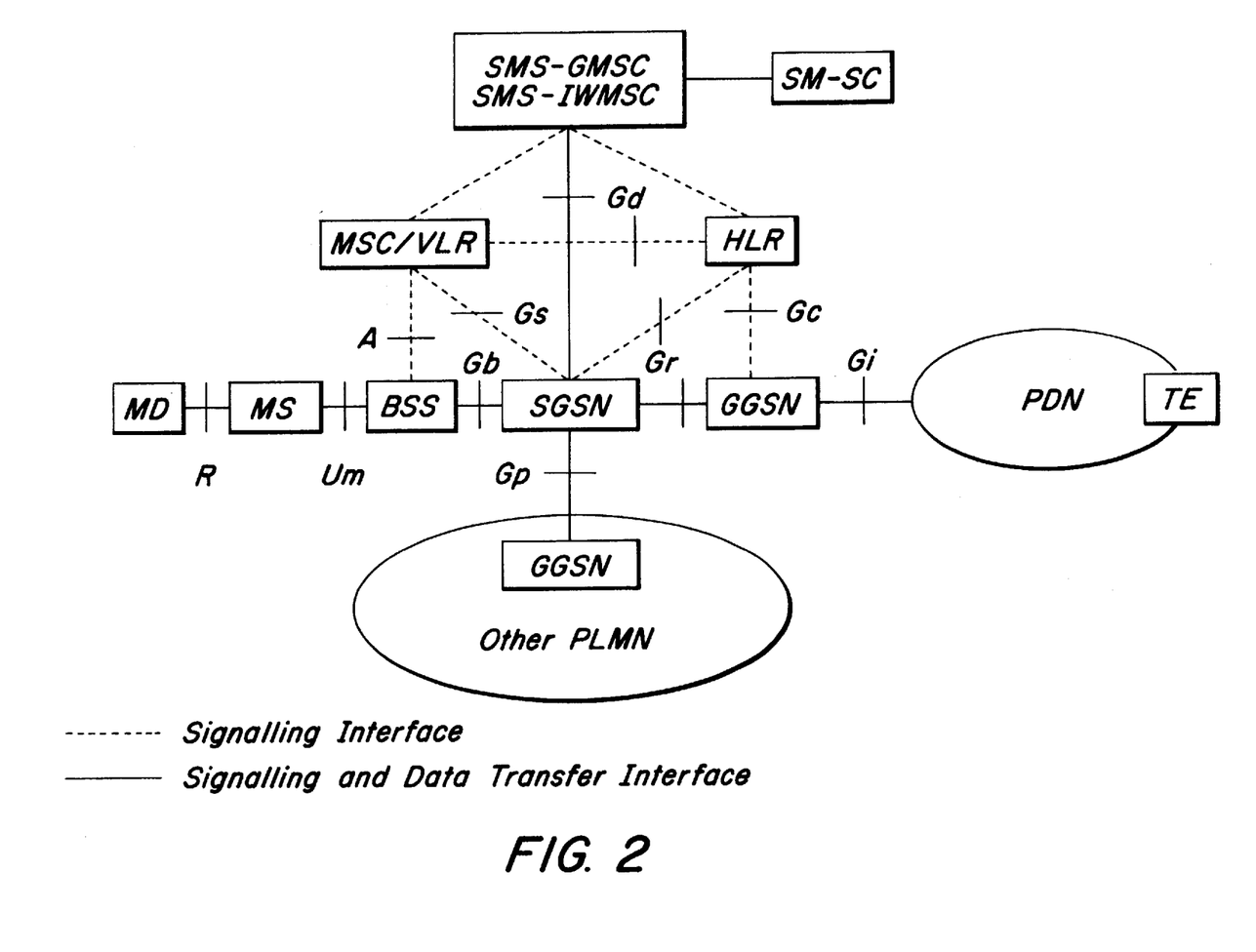
FIG. 2 shows an overview on the global packet radio service GPRS architecture.

The GGSN support node may request location information from the home location register HLR via the optional Gc interface shown in FIG. 2. The GGSN support node is the first point of a packet data network interconnection where a digital cellular communication network GSM supports global packet radio services GPRS. To this end the Gi interface is supported by the GGSN support node.

The intra-PLMN backbone network is the internet provider IP network interconnecting GSN support nodes within the same public land mobile network PLMN. Further, the inter-PLMN backbone network is the IP network interconnecting GSN support nodes and intra-PLMN backbone networks in different public land mobile networks PLMN.

Every intra-PLMN backbone network is a private IP network intended for GPRS data and GPRS signalling only. A private IP network is an IP network to which some access control mechanism is supplied in order to achieve a required level of security.

As shown in FIG. 1, two intra-PLMN backbone networks are connected via the Gp interface using border gateways BG and an inter-PLMN backbone network. The inter-PLMN backbone network is selected by a roaming agreement that includes the BG security functionality. The border gateway BG is not defined within the scope of general packet radio service GPRS. The inter-PLMN backbone can be a packet data network, e.g., the public internet or a leased line.

As shown in FIG. 2, the serving GPRS support node SGSN is the node that is serving the mobile station MS, i.e. supporting the Gb interface. At global packet service radio GPRS attach, the serving GPRS support node SGSN establishes a mobility management context containing information pertaining to, e.g., mobility and security for the mobile station. At PDP context activation, the serving GPRS support node SGSN establishes a PDP context to be used for routing purposes inside the GPRS public land mobile network PLMN, with the gateway GPRS support node GGSN that the GPPS subscriber users.

The serving GPRS support node SGSN and the gateway GPRS support node functionalities may be combined in the same physical node or they may reside in different physical nodes. The serving GPRS support node and the gateway GPRS support node may contain IP routing information and they may interconnect with IP routers. In case serving SGSN and gateway GGSN support nodes are in different public land mobile networks PLMN they are interconnected via the Gp interface. The Gp interface provides the functionality of the Gn interface plus security functionality required for inter-PLMN communication. This security functionality is based on mutual agreements between operators.

The serving GPRS support node SGSN may receive paging requests from the mobile service switching centre MSC and the visitors location register VLR via the Gs interface. Further, the home location register HLR contain global package radio service GPRS subscription data and routing information. The home location register HLR is accessible from the serving GPRS support node SGSN via the Gr interface. For roaming mobile stations MS the home location register HLR may lie in a different public land mobile network PLMN as the current serving GPRS support node SGSN. The SMS-GMSC and SMS-IWMSC are connected to the serving GPRS support node SGSN via the Gd interface to enable mobile stations MS using global packet radio services GPRS to send and receive short messages SMS via GPRS radio channels.

The global packet radio service GPRS logical architecture according to FIGS. 1 and 2 may be used to provide location dependent WWW services therein as outlined in the following.

Figure 3:
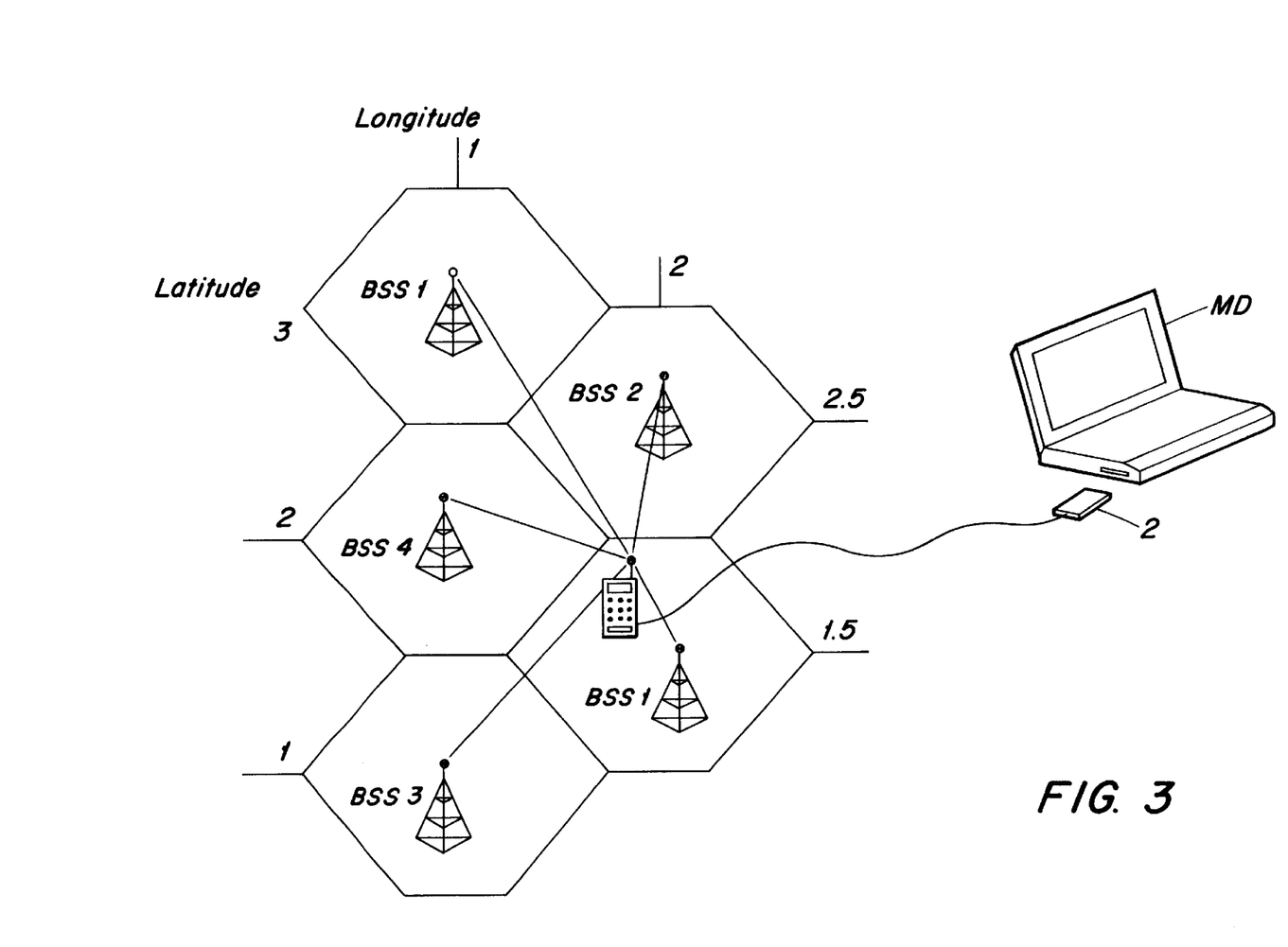
FIG. 3 shows a schematic diagram illustrating the estimation of a mobile station geographical location according to the invention.

As shown in FIG. 3, in an area with coverage of a digital cellular communication network GSM the mobile station MS receives location specific information of a cell broadcast channel CBCH, a broadcast control channel BCCH or a base station identity codes BSIC from at least one base station sub-system BSS. Thus, the mobile station MS always has exact information about its own current location within the GSM service area.

Further, a mobile station MS usually receives the location specific information not only from the base station sub-system BBS 1 wherein it is roaming, but also from adjacent base station sub-systems BSS 2 to BSS S.

The location specific information is exchanged with a mobile device MD that uses this information to either estimate the geographical location of the mobile station MS or to transfer the location specific information via SGSN support node, the intra-PLMN backbone and the gateway GPRS support node GGSN to a WWW server that may then estimates the required geographical location.

The WWW server is, e.g., installed in the packet data network, e.g. the internet or a LAN network. However, the number of WWW servers is not restricted to one, but several WWW servers may contribute to the provision of location dependent WWW services. These WWW servers can be arranged in a LAN they may reside at different locations.

As shown in FIG. 3, a mobile station MS is roaming in a cell 1 and directly receives broadcast information from a base station sub-system BSS1. In addition, a mobile station MS also receives corresponding broadcast information from adjacent cells 2 to 5 via related base station sub-systems BSS2 to BSS5. A link R between the mobile station MS and a mobile device MD such as a laptop is achieved via a mobile device interface, e.g. a PCMCIA data card 2 designed for such purposes. Specific examples of such PCMCIA data cards are DC12, DC23, DC33.

Figure 4:
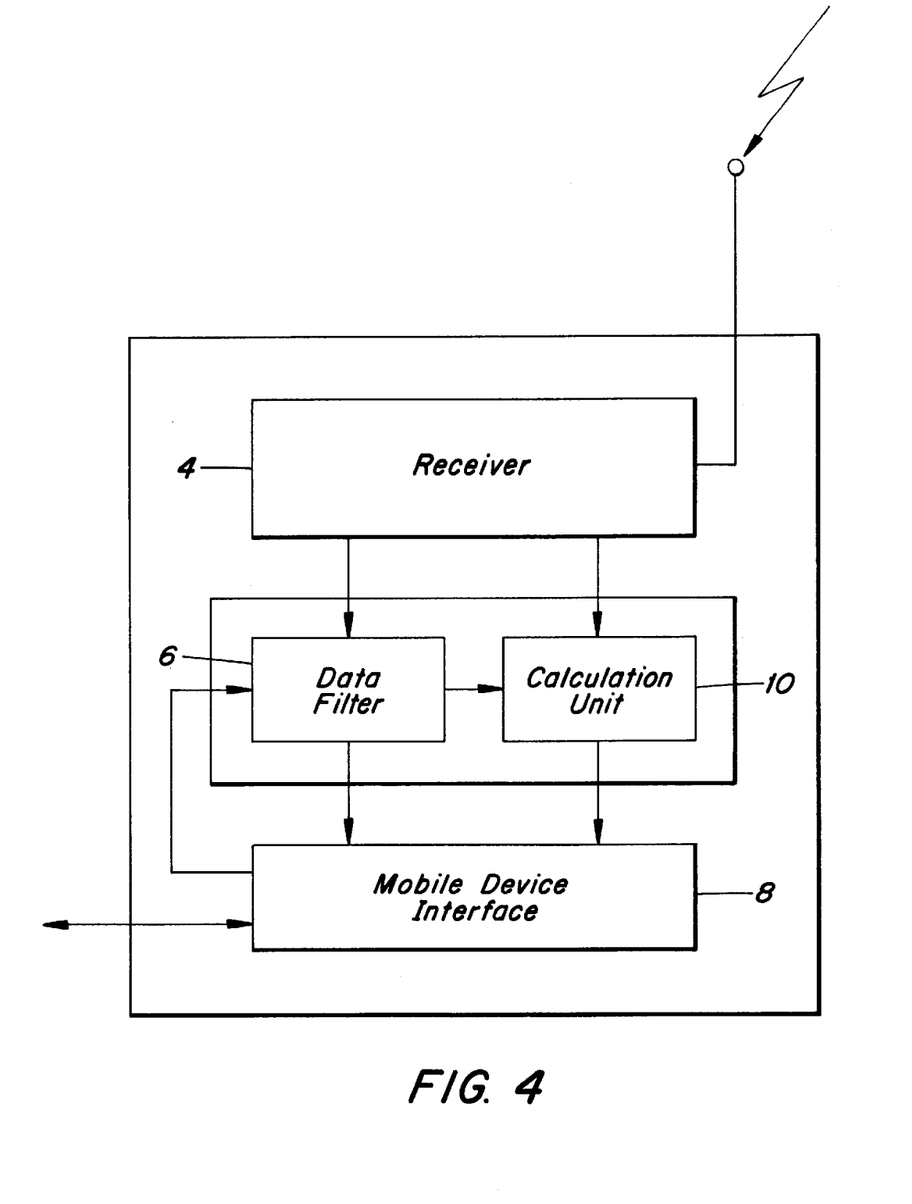
FIG. 4 shows a schematic diagram of a mobile station according to the invention.

As shown in FIG. 4, the mobile station MS comprises a receiver 4 to receive broadcast information transmitted via the plurality of base station sub-systems BSS1, . . . , BSS5 adjacent to the mobile station MS. In addition, there is provided a location data filter 6 adapted to select data specific to the location of the mobile station MS from the received broadcast information. A mobile device interface 8 establishes a connection to the mobile device MD roaming together with the mobile station MS. The mobile device interface 8 serves to receive a request for location specific data from the mobile device MD and to transfer the location specific data to the mobile device MD.

According to one embodiment, the location data filter 6 is adapted to select cell identifications transferred via the broadcast control channel BCCH and received also for the adjacent cells. Thus, location specific data is only selected within the mobile station and no further processing of this data takes place. Another option is to select base station identity codes BSIC received via the synchronization control channel SCH.

According to another embodiment, the mobile station MS comprises a calculation unit 10. In this case, the location data filter 6 should identify a longitude loi and a latitude lai for each adjacent cell. The calculation unit 10 may then estimate the geographical location of the mobile station in view of given longitudes and latitudes loi, lai. The longitude is estimated as the position where the mobile station MS has the same distance to the cell lying furthest east and furthest west. Accordingly, the latitude lai of the mobile station is estimated as the position that has the same distance to the cell being furthest north and the cell being furthest south.

One example for such an estimation process is illustrated in FIG. 3. Assuming that the latitudes of cells 1 to 5 are 1.5, 2.5, 1, 2, 3, respectively, and that the corresponding longitudes are 2, 2, 1, 1, 1, respectively, the estimated longitude and latitude for the mobile station is 2 and 1.4, respectively. Contrary to the latitude 1.5 and the longitude 2 of cell 1 where the mobile station MS is roaming, the estimated latitude and longitude lae and loe therefore is slightly moved to the left and upwards, respectively, since the mobile station MS also receives location information from cells lying in these directions.

Of course any generalized approach may be used to derive an estimated geographical location for the mobile station MS from the location information available through the digital cellular communication network. One further example would be, to assign different weight factors to the different latitude and longitude, respectively.

Figure 5:
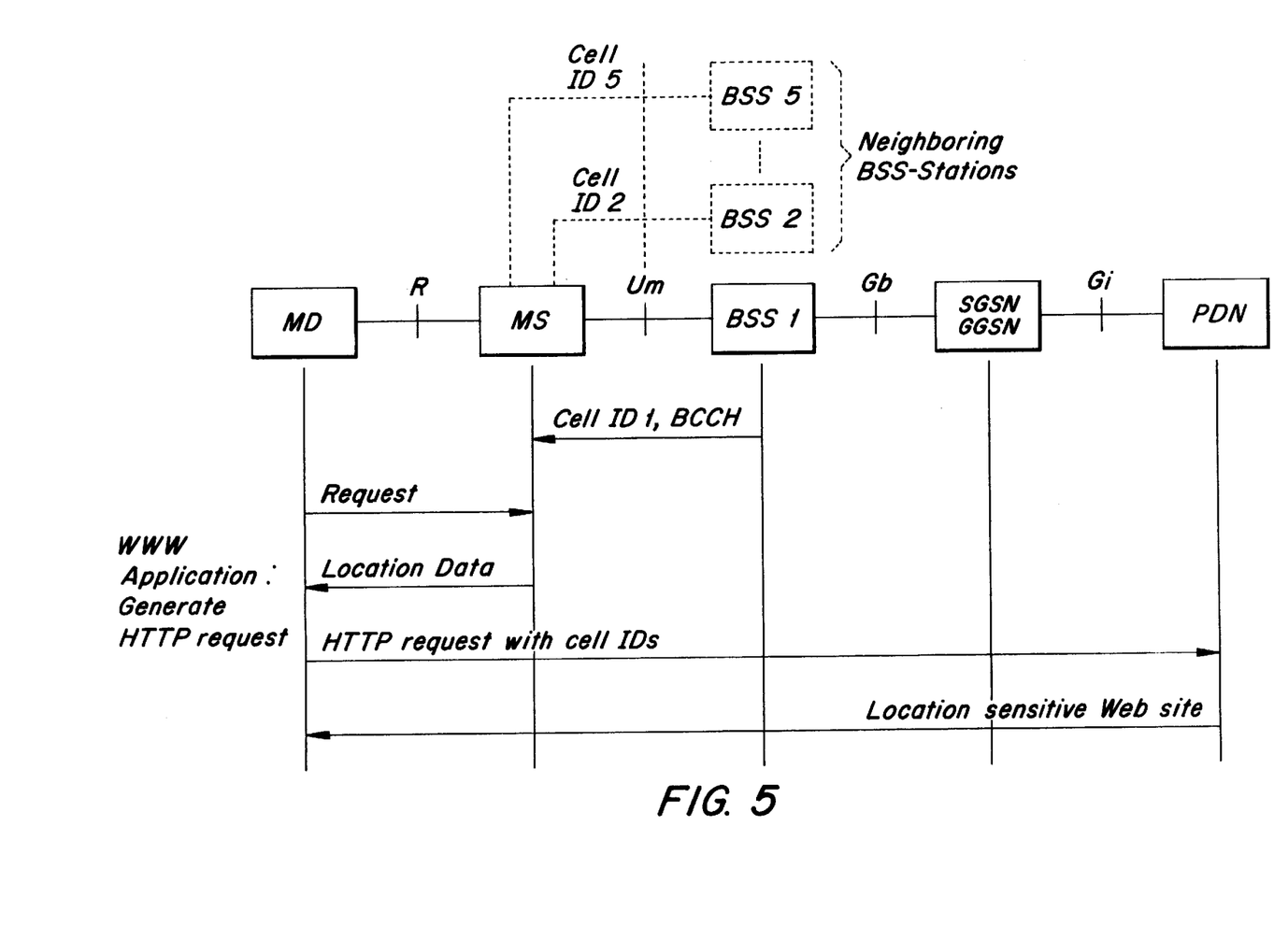
FIG. 5 shows the transmission of geographical location information in a GPRS system according to the invention.
Figure 7:
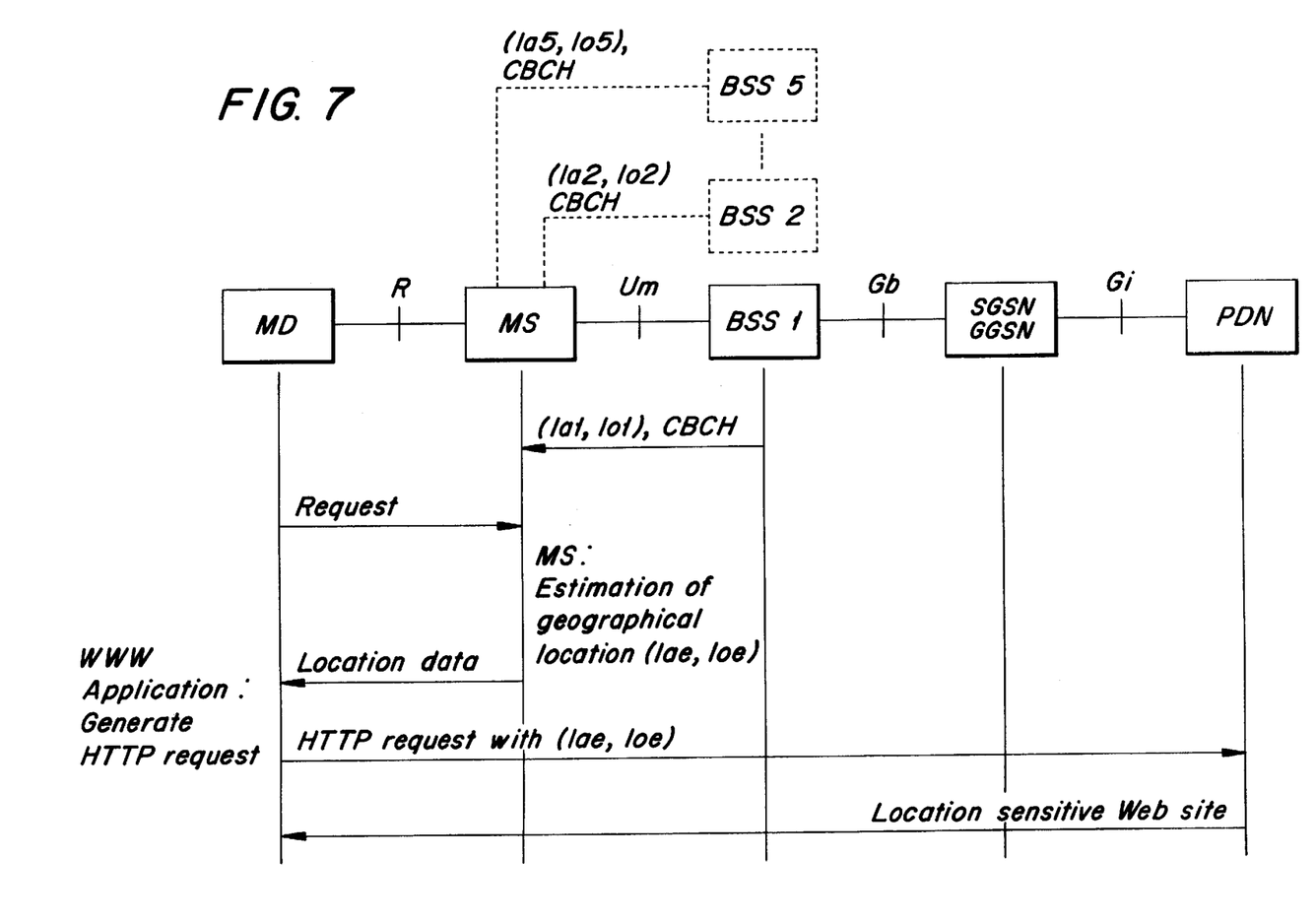
FIG. 7 shows a modified transmission of geographical location information in a GPRS system according to the invention.

The overall provision of location dependent WWW services in a digital cellular communication network is illustrated in FIGS. 5 and 7.

The serving and gateway GPRS support nodes GPSN and GGSN transfer cell IDs ID1, ID2, . . . , ID5 or base station identity codes BSCI1, . . . , BSCI5 received by the mobile station MS via the base station sub-stations BSS1, . . . , BSS5, respectively, to a WWW Server installed in the packet data network.

As shown in FIG. 5, cell IDs or base station identity codes BSCI1, . . . , BSCI5 received and selected by the mobile station MS are transferred as location data to the mobile device on request therefrom. A WWW application running on the mobile device MD includes all cell IDs or base station identity codes BSCI1, . . . , BSCI5 into an appropriate request written in hypertext transmission protocol HTTP.

This HTTP request is then transferred to a WWW server in the packet data network, e.g. the Internet or X.25, via the corresponding serving GPRS support node SGSN and gateway GPRS support node GGSN without any data exchange in the digital cellular communication network. Since no mobile station location information is provided to the digital cellular communication network this allows for significantly improved privacy for the location dependent WWW services. According to an alternative approach, this request for geographical information and the initialization of location dependent WWW services could also be carried out by the mobile station MS itself, in case a WWW application is installed therein.

Figure 6:
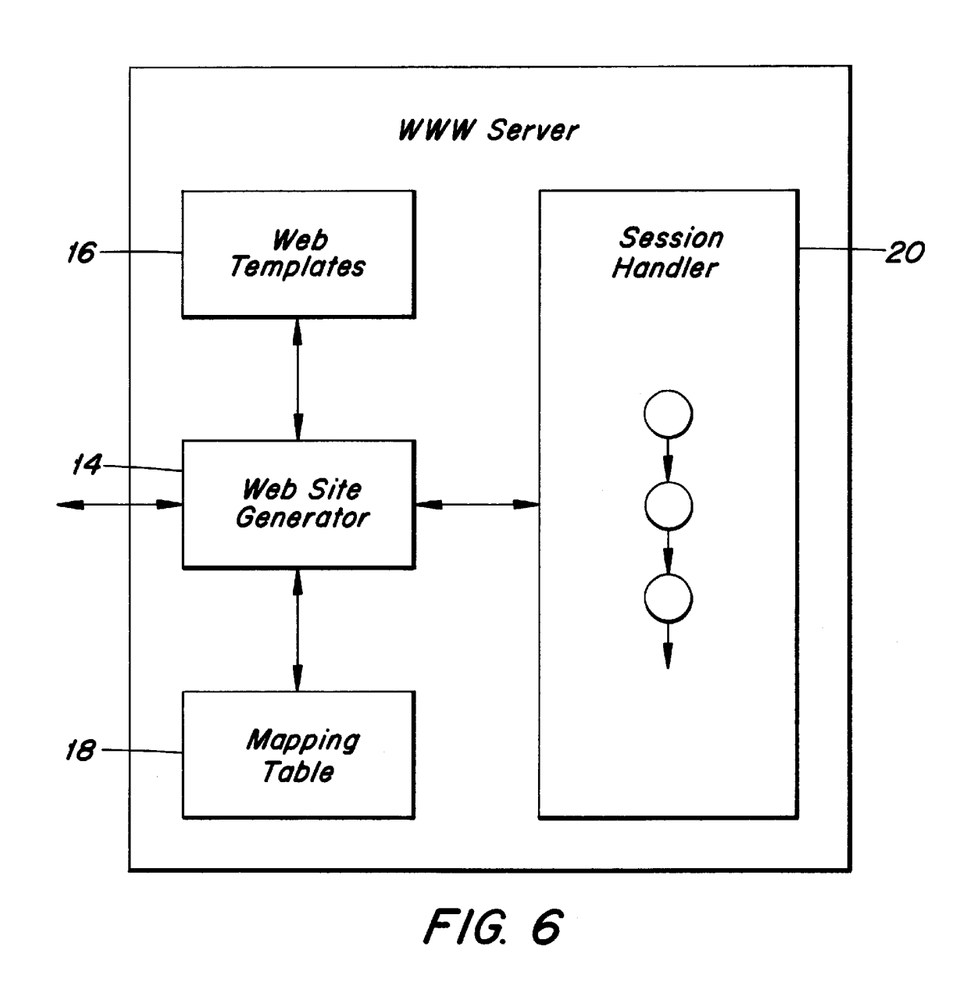
FIG. 6 shows a schematic diagram of a WWW server according to the invention.

The structure of the WWW server is shown in FIG. 6. The WWW server comprises a web site generator 14 that generates web sites to be retransmitted to the mobile device MD on reception of the HTTP request received therefrom. In addition, there is provided a storage unit 16 storing elements to construct such a web site and being used on demand. To convert the cell IDs of cells adjacent to the mobile station MS and the mobile device MD, respectively, there is also provided a mapping table 18 to transfer the cell identifications cell ID or base station identity codes BSIC into geometric positions of the respective base station subsystems BSS1, . . . , BSS5 so as to estimate the geometrical location of the mobile station MS and the mobile device MD.

Therefore, according to the embodiment shown in FIG. 5, the actual estimation of the geometrical location necessary to provide location dependent WWW services is carried out within the WWW server. After the estimation of the geometrical location a location sensitive web site, e.g., weather forecast information or location map information, may then be retransferred to the mobile device MD. Here, the precision for the geometrical location is +/−30 km at the worst. The smaller the cell size in a specific area, the better this worse case precision.

The mapping table 18 comprises a correspondence between cell IDs or base station identity codes BSCI and exact geographical positions in terms of latitude and longitude of respective cells and base station sub-systems. Therefore, once the cell IDs or base station identity codes BSCI are available within the WWW server, the geometrical location of the mobile station MS is calculated as outlined above.

FIG. 7 shows the provision if location dependent WWW services in case the mobile station MS also comprises the calculation unit 10. Here, the latitude lai and the longitude loi of each cell are transferred via the base station subsystems BSS1 to BSSS to the mobile station MS via the cell broadcast channel CBCH. On request of the mobile device MD an estimation of the geographical location is carried in the mobile station MS. Therefore, only a single estimated latitude lae and a single estimated longitude loe are transferred as location data to the mobile device MD.

This embodiment is more complex as it requires that the latitude lai and the longitude loi of each cell is stored in the network and switching sub-system NSS and that this information is inserted in the cell broadcast channel CBCH. In case the estimation of the geographical location of the mobile station MS is done in the mobile station MS itself according to the algorithms outlined above, the WWW application running on the mobile device MD can directly request the estimated latitude lae and the estimated longitude loe via the mobile device interface 8 so that no special requirements, i.e. the mapping table 18, are imposed on the receiving WWW server. Any WWW server offering location sensitive Web sites based on latitude and longitude of the requesting WWW application can therefore be used.

The major advantage of this alternative is that it does not require that the mobile station MS reports any data back to the digital cellular communication network for determining its geographical location. This issue is very important in case privacy concerns are crucial. Up till now this is not considered and supported by known solutions.

When WWW application requests are processed independently in time sequential manner the WWW model works well. On the other hand, complex services may require the maintenance of state and control-flow information at the WWW server across multiple WWW applications, and this violates the assumption of independence.

Complex web services require multiple, sequential, and related interactions to occur over extended periods of time. As part of such a WWW application the user may wish to suspend a session and resume it later, or the WWW server may transfer the control of the session to another WWW application. According to the invention, all information about session progress is maintained on the WWW server, so that it is possible to implement recovery mechanisms that support extended WWW applications.

According to the invention, the handling of such complex web services is achieved through a session handler 20 wherein a sequence of interactions being related to a plurality of location dependent WWW services is represented as single session with a state flow graph.

When a session sends out a document via the Web site generator 14 execution is suspended and the state is stored on a disk or in a data base. When a response is received, execution resumes from the point of suspension, with the automatic state restored. The session continues until another WWW service is invoked, sending another location dependent web site to the user.

In case of multiple WWW services, web sites are written such that their content is dynamically customized according to the respective HTTP request so that different Web sites are sent out by the web site generator 14 depending on the geographical position of the invoking mobile device MD and mobile station MS, respectively.

Separating the service logic from the web site generator 14 allows for an effective implementation of the WWW server. In particular, the control and information flow of all interaction being related to one or more WWW application is handled in a central location, i.e. the session handler 20. This enables dynamic tracing and visualization of service behaviour and usage patterns.

Overall, a scenerio for the provision of location dependent services may, e.g., be that a subscriber having its home location register HLR in a public land mobile network PLMN A and moves on to another public land mobile network PLMN B, as shown in FIG. 1. Here, the subscriber needs information, e.g., on traffic jams when roaming with a car. Also, when the subscriber arrives at the final destination within the public land mobile network PLMN B, he may need actual information on cultural events.

As shown in FIG. 1, the subscriber is initially connected to the intra-PLMN backbone via one of the serving GPRS support nodes SGSN. As outlined above, this intra-PLMN backbone is linked via the gateway GPRS support node to the packet data network so that a link is achieved to one of the WWW servers installed therein. This link is used to provide, e.g., the route information or the information on traffic jams that the subscriber needs for avoiding any delay when travelling towards the final destination.

Here, the subscriber finally traverses from public land mobile network PLMN A to public land mobile network PLMN B. At this point, a handover takes place both in view of the standard handover in a digital cellular communication network and the exchange of location data with respect to location dependent WWW services outlined with respect to FIGS. 5 and 7. The entries in the visitor location register VLR of both public land mobile networks PLMN A and B are adapted and the subscriber is assigned to a mobile service switching centre MSC within the public land mobile network B so as to provide data to the subscriber also within the public land mobile network B.

Further, with respect to the WWW services the service handover is executed via the border gateways BG linked to the inter-PLMN backbone and intra-PLMN backbone, respectively. Once this service handover is carried out the subscriber is now linked via the serving GPRS support node and gateway GPRS support node in public land mobile network B to the packet data network. Thus, route information or information of traffic jams may now be provided via this modified link. Further, once the subscriber has reached the final destination he may also request any further useful location dependent information, e.g., information on social or cultural events.

Abbreviations:

| | |
|---|---|
| BCCH | Broadcast Control Channel |
| BTS | Base Transceiver Station |
| CBCH | Cell Broadcast Channel |
| DAN | Direct-IP-Access Node |
| GPRS | Global Packet Radio Service |
| GPS | Global Positioning System |
| GSN | GPRS Support Node |
| HTML | HyperText Markup Language |
| HTTP | HyperText Transmission Protocol |
| IP | Internet Protocol |
| ISP | Internet Service Provider |
| MS | Mobile Station |
| PCMCIA | Hardware/software interface definition for portable computers |
| LAN | Local Area Network |
| TCH | Traffic Channel |
| WWW | World Wide Web |

What is claimed is:

1. A mobile station (MS) for a digital cellular communication network (GSM) interfacing to a server supporting WWW services, comprising:

a) a receiver (4) for broadcast information transmitted from at least one base station subsystem (BSS 1; . . . ; BSS 5), b) a location data filter (6) adapted to select location specific data from said received broadcast information, and c) a mobile device interface (8) adapted to establish a connection to a mobile device (MD) being connected to the mobile station (MS), to receive a request for said location specific data from said mobile device (MD) and to transfer said location specific data to said mobile device (MD) to generate a request for location dependent services, wherein d) location information comprised in said request for location dependent services is transferred to the server without reporting the location information to the digital cellular communication network.

2. The mobile station according to claim 1, wherein said location data filter (6) is adapted to identify a cell identification (Cell Idi) for said base station sub-system (BSS 1; . . . ; BSS 5) as location specific data.

3. The mobile station according to claim 1, wherein said location data filter (6) is adapted to identify a base station identity code (BSIC i) for said base station sub-system (BSS 1; . . . ; BSS 5) as location specific data.

4. The mobile station according to claim 1, wherein said location data filter (6) is adapted to identify a longitude (loi) and a latitude (lai) for said base station sub-system (BSS 1; . . . ; BSS 5) as location specific data.

5. The mobile station according to claim 4, wherein said mobile station (MS) further comprises a calculation unit (10) receiving said longitude (loi) and latitude (lai) of said base station sub-system (BSS 1; . . . ; BSS 5) to determine an estimated longitude (loe) and latitude (lae) for said mobile station (MS).

6. The mobile station according to claim 5, wherein said calculation unit (10) calculates said estimated longitude (loe) and latitude (lae) as linear mean value in case more than one value for longitude (loi) and latitude (lai) are received, respectively.

7. A global data bearer service system, comprising:
a) a digital cellular communication network (GSM) with
   a1) at least one switching sub-system (MSC, HLR, VLR) adapted to transfer broadcast information to at least one base station sub-system (BSS 1; . . . ; BSS5) in said digital cellular communication network,
   a2) a mobile station (MS) roaming in said digital cellular communication network (GSM) and receiving broadcast information form said base station sub-system (BSS 1; . . . ; BSS 5),
   a3) a mobile device (MD) connected to said mobile station (MS) via a mobile device interface (8),
b) a packet data network (IP, X.25) connecting a server to the mobile device (MD) via at least one global data bearer service (GPRS) support node (SGSN, GGSN) wherein
c) said mobile station (MS) comprises a location data filter (6) adapted to transfer location specific data extracted from said broadcast information to said mobile device (MD) to generate a request for location dependent WWW services,
d) said mobile device (MD) is adapted to request a location dependent service from said server on the basis of said location specific data such that location information comprised in said request for location dependent services is transferred to the server without the location information to the digital cellular communication network, and
e) said server comprises a site generator (14) to generate a location dependent site according to said received request.

8. The global data bearer service system according to claim 7, wherein said server further comprises a storage unit (10) storing site elements used to generate a requested site on demand.

9. The global data bearer service system according to claim 7, wherein said server further comprises a session handler (20) to manage a plurality of simultaneous demands in parallel.

10. The global data bearer service system according to claim 8, wherein said server further comprises a session handler (20) to manage a plurality of simultaneous demands in parallel.

11. The global data bearer service system according to claim 7, wherein said location data filter (6) is adapted to transfer a cell identification (Cell Idi) of said base station sub-system (BSS 1; . . . ; BSS 5) to said mobile device (MD) as location specific data.

12. The global data bearer service system according to claim 11, wherein said server further comprises a storage unit (10) storing site elements used to generate a requested site on demand.

13. The global data bearer service system according to claim 11, wherein said server further comprises a session handler (20) to manage a plurality of simultaneous demands in parallel.

14. The global data bearer service system according to claim 13, wherein said server further comprises a storage unit (10) storing site elements used to generate a requested site on demand.

15. The global data bearer service system according to claim 7, wherein said location data filter (6) is adapted to transfer a base station identity code (BSIC i) of said base station sub-system (BSS 1; . . . ; BSS 5) to said mobile device (MD) as location specific data.

16. The global data bearer service system according to claim 15, wherein said server further comprises a storage unit (10) storing site elements used to generate a requested site on demand.

17. The global data bearer service system according to claim 15, wherein said server further comprises a session handler (20) to manage a plurality of simultaneous demands in parallel.

18. The global data bearer service system according to claim 17, wherein said server further comprises a storage unit (10) storing site elements used to generate a requested site on demand.

19. A global data bearer service system, comprising:
a) a digital cellular communication network (GSM) with
   a1) at least one switching sub-system (MSC, HLR, VLR) adapted to transfer broadcast information to at least one base station sub-system (BSS 1; . . . ; BSS5) in said digital cellular communication network,
   a2) a mobile station (MS) roaming in said digital cellular communication network (GSM) and receiving broadcast information form said base station sub-system (BSS 1; . . . ; BSS 5),
   a3) a mobile device (MD) connected to said mobile station (MS) via a mobile device interface (8),
b) a packet data network (IP, X.25) connecting a server to the mobile device (MD) via at least one global data bearer service (GPRS) support node (SGSN, GGSN) wherein
c) said mobile station (MS) comprises a location data filter (6) adapted to transfer location specific data extracted from said broadcast information to said mobile device (MD) to generate a request for location dependent WWW services,
d) said mobile device (MD) is adapted to request a location dependent service from said server on the basis of cell identifications (Cell Idi) or base station identity codes (BSIC i) as location specific data included into said request for said location dependent service such that location information comprised in said request for location dependent services is transferred to the server without the location information to the digital cellular communication network, and e) said server comprises a site generator (14) to generate a location dependent site according to said received request.

20. The global data bearer service system according to claim 19, wherein said server further comprises a mapping table (18) to map a transferred cell identification (Cell Idi) into a geometric position of said respective base station sub-system (BSS 1; . . . ; BSS 5) so as to estimate said Geometrical location of said mobile station (MS) and said mobile device (MD).

21. The global data bearer service system according to claim 19, wherein said server further comprises a mapping table (18) to map a transferred base station identity codes (BSCI i) into a geometric position of said respective base station sub-system (BSS 1; . . . ; BSS 5) so as to estimate said geometrical location of said mobile station (MS) and said mobile device (MD).

22. A global data bearer service system, comprising:
a) a digital cellular communication network (GSM) with
a1) at least one switching sub-system (MSC, HLR, VLR) adapted to transfer broadcast information to at least one base station sub-system (BSS 1; . . . ; BSS5) in said digital cellular communication network,
a2) a mobile station (MS) roaming in said digital cellular communication network (GSM) and receiving broadcast information form said base station sub-system (BSS 1; . . . ; BSS 5),
a3) a mobile device (MD) connected to said mobile station (MS) via a mobile device interface (8),
b) a packet data network (IP, X.25) connecting a server to the mobile device (MD) via at least one global data bearer service (GPRS) support node (SGSN, GGSN) wherein
c) said mobile station (MS) comprises a location data filter (6) adapted to transfer location specific data extracted from said broadcast information to said mobile device (MD) on request of said mobile device (MD),
d) said mobile device (MD) is adapted to request a location dependent service from said server on the basis of said location specific data such that location information comprised in said request for location dependent services is transferred to the server without the location information to the digital cellular communication network, and
e) said server comprises a site generator (14) to generate a location dependent site according to said received request.

23. The global data bearer service system according to claim 22, wherein said location data filter (6) is adapted to identify a longitude (loi) and a latitude (lai) for said base station sub-system (BSS 1; . . . ; BSS 5) from said location specific data.

24. The global data bearer service system according to claim 23, wherein said mobile station (MS) further comprises a calculation unit (10) receiving said longitude (loi) and latitude (lai) of said base station sub-system (BSS 1; . . . ; BSS 5) to determine an estimated longitude (loe) and latitude (lae) for said mobile station (MS).

25. The global data bearer service system according to claim 24, wherein in case a plurality of longitudes (loi) and latitudes (lai) are received said calculation unit (10) calculates estimated longitude (loe) and latitude (lae) as linear mean value of all received longitudes (loi) and latitudes (lai), respectively.

26. The global data bearer service system according to claim 25, wherein said mobile device (MD) is adapted to include estimated longitude (loe) and latitude (lae) into said request for said location dependent service.

27. The global data bearer service system according to claim 26, wherein said site generator (14) in said server selects a site from said storage unit (16) on the basis of said estimated longitude (loe) and latitude (lae).

28. The global data bearer service system according to claim 7, wherein said server is a WWW server.

29. The global data bearer service system according to claim 7, wherein said location dependent service is an internet service.

30. The global data bearer service system according to claim 7, which uses packet switched data bearer services.

31. The global data bearer service system according to claim 7, which uses circuit switched data bearer services.

32. A method to provide location specific service in a global packet service system, comprising the steps:
a) establishing a communication channel between
a1) a mobile device (MD) being interfaced to a mobile station (MS) roaming in a digital cellular communication network (GSM) and
a2) a server installed in a packet data network (LAN),
b) transferring location specific data (Cell Idi, lae, loe) extracted from broadcast information received by said mobile station (MS) to said mobile device (MD) on request of said mobile device (MD) to generate a request for location dependent services
c) transferring a request for a location dependent service from said mobile device (MD) to said server on the basis of said location specific data such that location information comprised in said request for location dependent services is transferred to the server without the location information to the digital cellular communication network, and
d) transferring a location dependent site from said server to said mobile device (MD).

33. The method according to claim 32, wherein cell identification (Cell Idi) of at least one base station sub-system (BSS 1; . . . ; BSS 5) is transferred to said mobile device (MD) as location specific data.

34. The method according to claim 33, wherein said received at least one cell identification (Cell Idi) is included into said request for said location dependent service.

35. The method according to claim 34, wherein in said server said cell identification (Cell Idi) is transferred into a geometric position of said respective base station sub-system (BSS 1; . . . ; BSS 5) using a mapping table (18) so as to estimate said geometrical location of said mobile device (MD) as basis for said location dependent service.

36. The method according to claim 32, wherein said base station identity code (BSCI i) of at least one base station sub-system (BSS 1; . . . ; BSS 5) is transferred to said mobile device (MD) as location specific data.

37. The method according to claim 36, wherein said received at least one base station identity code (BSCI i) is included into said request for said location dependent service.

38. The method according to claim 30, wherein in said server said base station identity code (BSCI i) is transferred into a geometric position of said respective base station sub-system (BSS 1; . . . ; BSS 5) using a mapping table (18) so as to estimate said geometrical location of said mobile device (MD) as basis for said location dependent service.

39. The method according to claim 32, wherein on the basis of a longitude (loi) and latitude (lai) of said base station sub-system (BSS 1; . . . ; BSS 5) an estimated longitude (loe) and latitude (lee) for said mobile station (MS) is determined.

40. The method according to claim 39, wherein in case more than one value for longitude (loi) and latitude (lai) prevail said estimated longitude (loe) and latitude (lae) is calculated as linear mean value of all longitudes (loi) and latitudes (lai), respectively.

41. The method according to claim 40, wherein said estimated longitude (loe) and latitude (lae) are included into said request for said location dependent service.

42. The method according to claim 41, wherein a site is selected from a storage unit (16) in said server on the basis of said estimated longitude (loe) and latitude (lae) included in said request.

* * * * *